Figure 1:
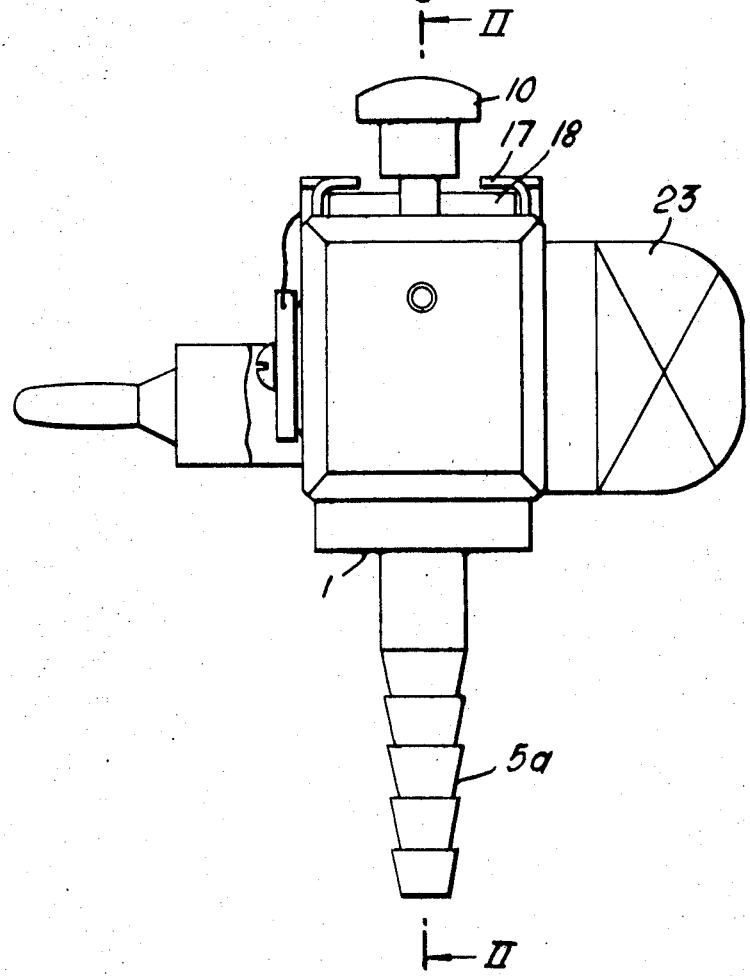

United States Patent

[11] 3,578,944

| | | |
|---|---|---|
| [72] | Inventor | Arieh Kermen<br>Dimona, Israel |
| [21] | Appl. No. | 834,363 |
| [22] | Filed | June 18, 1969 |
| [45] | Patented | May 18, 1971 |
| [73] | Assignee | The State of Israel, Atomic Energy Commission<br>Beer-Sheba, Israel |
| [32] | Priority | July 4, 1968 |
| [33] | | Israel |
| [31] | | 30308 |

[54] WELDING ASSEMBLAGE
3 Claims, 3 Drawing Figs.

[52] U.S. Cl. .................................................. 219/130,
219/75
[51] Int. Cl. .................................................. B23k 9/00

[50] Field of Search............................................. 219/75,
130, 136, 137

[56] References Cited
UNITED STATES PATENTS
3,471,678  10/1969  Hodder ........................ 219/130

*Primary Examiner*—J. V. Truhe
*Assistant Examiner*—C. L. Albritton
*Attorney*—Ward, McElhannon, Brooks and Fitzpatrick ABSTRACT: Welding equipment particularly for arc-welding a junction of two wires, for example, for forming a thermocouple junction wherein the junction is held by means of a gripping unit of substantial heat capacity, the gripping unit consisting of two constituent elements which can be displaced with respect to each other so as to vary the aperture defined between the elements and designed to receive the junction.

WELDING ASSEMBLAGE

This invention relates to welding equipment and is particularly concerned with welding equipment for arc-welding a junction of two wires or the like, for example, for forming a thermocouple junction.

Considerable difficulties are often encountered in forming the welded junctions of thermocouples. Thus, it is a common practice to twist the junction to be welded together prior to welding. With such an arrangement, however, the actual thermocouple junction is not always obtained in the desired position and subsequent measurements are consequently rendered inaccurate. Furthermore considerable difficulty is often encountered in ensuring the correct positioning of the weld and in preventing welding taking place over a prolonged period of time thereby leading to excessive consumption of the thermocouple. Accordingly it is often necessary to employ highly skilled personnel to obtain welded junctions.

It is an object of the present invention to provide welding equipment for the purpose specified in which the above referred to disadvantages are substantially reduced or avoided.

According to the present invention there is provided welding equipment for arc-welding a junction of two wires or the like comprising an insulating casing having formed therein a welding cavity, means for introducing an inert gas into the cavity, an electrode holder adapted to hold an electrode so that its tip projects into the cavity and a junction gripping unit of substantial heat capacity adapted to grip a junction to be welded so that the junction projects into the cavity, said unit comprising a fixed member and a rotatable member having an eccentric surface, said surface and member defining between them an aperture designed to receive said junction, rotation of said displaceable member resulting in the enlargement or reduction of said aperture, and means for supplying welding voltage to said holder and one of said members.

With such equipment the pair of wires whose junction is to be welded is introduced with its tip projecting through the aperture into the cavity. The aperture is then reduced by rotation of the displaceable member so that the junction is firmly clamped by the gripping unit. The welding voltage is thereupon applied and an arc is formed between the junction and the electrode. This arc results in the fusion of the junction and the production of a molten ball. Fusion can, however, not proceed further than the gripping unit, which, being of massive heat capacity, prevents the heating up of the junction beyond the gripping unit. In this way, irrespective of whether welding proceeds for a relatively short or long time, no untoward damage occurs.

Figure 3:
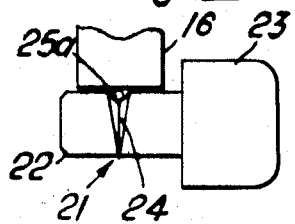
Figure 2:
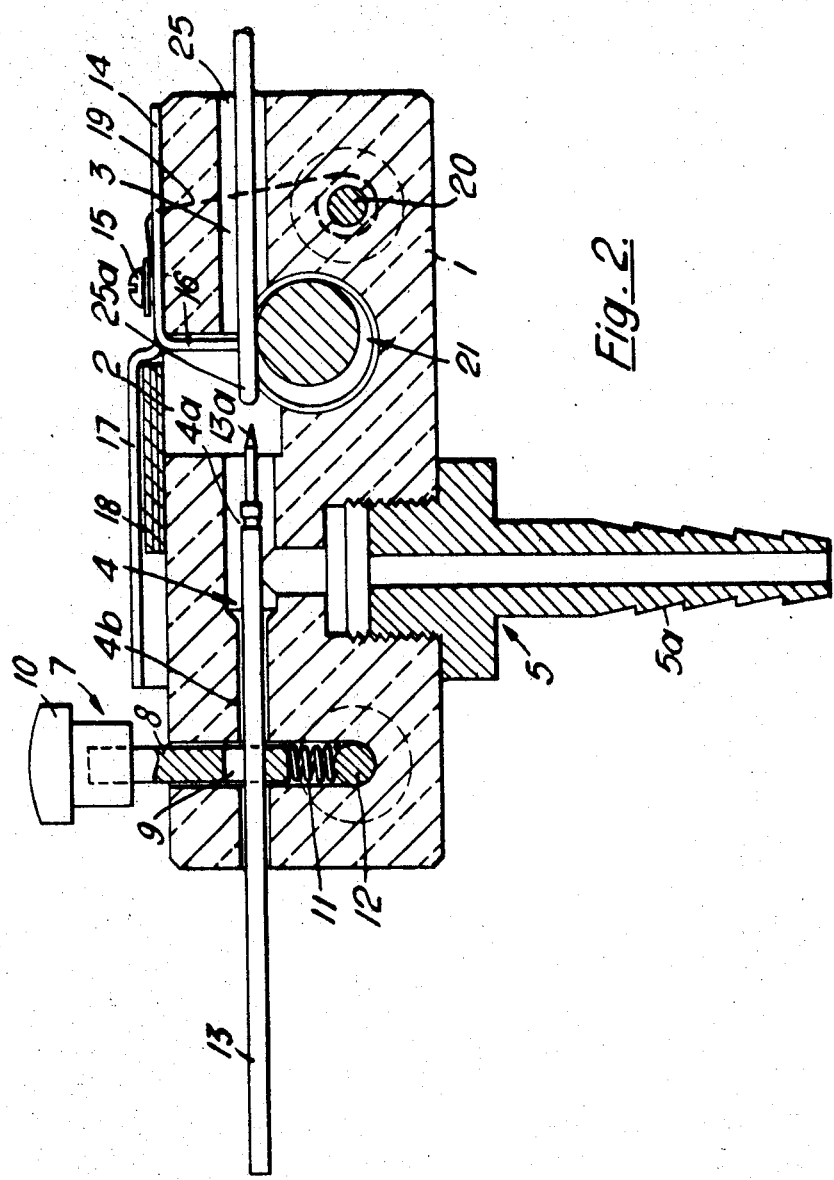

One manner of carrying out the invention will now be described by way of example and with reference to the accompanying drawings, in which:

FIG. 1 is a side elevation of thermocouple welding equipment in accordance with the invention, FIG. 2 is a cross-sectional view of the equipment shown in FIG. 1 and taken along the line II–II, and FIG. 3 is a view of a detail of the equipment shown in FIG. 2.

As seen in FIGS. 1 and 2 of the drawings the equipment comprises an insulating casing 1 formed of a suitable insulating material such as that known under the Trade Name Bakelite. Formed in the casing 1 is a main welding cavity 2 which communicates on the one hand with a thermocouple feed channel 3 and on the other hand with an electrode feed channel 4 which is constituted by successive portions, a relatively wide portion 4a, adjacent the welding cavity 2 and a relatively narrow portion 4b. An insert gas inlet bushing 5 is screwed into an appropriate inlet aperture 6 formed in the casing 1, the aperture 6 communicating with the electrode channel portion 4a. The bushing 5 is provided with a coupling nozzle 5a adapted to be connected to a gas feedpipe.

A spring loaded electrode holder 7 extends into the casing and through the channel portion 4b (being directed normally thereto). The holder 7 comprises a rod 8 having a through-going aperture 9 and a cap 10. The lower end of the rod 8 bears via a compression spring 11 on an electrical terminal bolt 12 which passes out of the casing. A tungsten electrode 13 is introduced into the apparatus via the channel 4, the electrode passing through the aperture 9 formed in the holder rod 8, whilst the tip 13a of the electrode projects into the welding cavity 2. The electrode 13 is firmly held in position by being pressed upwardly against the upper wall of the channel 4 by means of the compression spring 11 and holder rod 8.

An electrically conductive plate 14 is secured by a bolt 15 to the upper surface of the casing 1 and is formed integrally with a central downwardly projecting limb 16 which extends into the welding cavity 2 and a pair of side limbs 17 which extend over the central cavity 2 and the casing 1 so as to retain, in position, a protective glass window 18 which effectively covers the cavity 2. Electric contact is effected between the limb 16 via the bolt 15 and a conductor 19 and a terminal bolt 20 which extends out of the casing.

A thermocouple gripping member 21 extends through the casing being rotatably journaled therein. As can be seen clearly in FIG. 3 of the drawings, the member 21 consists of a cylindrical rod 22 formed integrally with a turning head 23. A V-shaped groove 24 is formed in the periphery of the rod 22, the depth of the groove 24 increasing uniformly from zero to a maximum at a position diametrically opposite the position of zero depth and then uniformly decreasing again to zero. As can be seen clearly in FIGS. 2 and 3 of the drawings the relative disposition of the limb 16 and cylindrical rod 22 is such that the lower edge of the limb 16 is parallel to and closely spaced from the corresponding surface of the rod 22. The edge of the limb 16 and the corresponding V-shaped groove 24 defines a triangular recess adapted to receive the end 25a of a thermocouple 25 which is introduced into the apparatus via the channel 3.

In practice the terminal bolts 12 and 20 are coupled, via a plug 26 to a DC voltage supply (details of the electric circuit will not be gone into here as they are of standard construction). A supply of argon gas is fed to the apparatus via the nozzle 5a. The tungsten electrode 13 is placed in position, (the correct positioning of the tip 13a thereof being observable through the window 18) and is clamped by means of the electrode holder 7. The thermocouple clamping element 21 is then adjusted (by rotation of the turning head 23) so that the portion of the V-shaped groove 24 of maximum depth is directly opposite the electrically conductive limb 16. In this position the thermocouple 25 is introduced via the channel 3 and through the triangular gap formed between the cylindrical rod 22 and limb 16. With the tip 25a of the thermocouple 25 to be welded disposed opposite the tip 13a of the tungsten rod 13, the turning head 23 is rotated, thereby causing the thermocouple to be firmly clamped against the limb 16. An electric current is then passed to the respective electrodes and an argon arc is struck between the opposite tips 13a and 25a. This arc causes the melting of the tip 25a of the thermocouple and the formation of a molten ball. Melting of the thermocouple cannot proceed beyond the limb 16 seeing that the relatively massive limb and cylindrical rod 22 serves to absorb the heat at this point.

It can be readily seen that there is no critical time factor involved in the welding of the thermocouples with the equipment just described seeing that even if the welding proceeds for a longer time than would normally be necessary, no damage results in view of the fact that the welding cannot proceed beyond the limb 16. Furthermore, it is no longer necessary (as was the case in accordance with hitherto proposed methods) to twist the thermocouple into the contact prior to welding and in consequence the position of the thermocouple joint can be accurately determined, thereby facilitating subsequent measurements. Finally, the welding of the thermocouple does not require any specialized training seeing that there are no critical factors involved.

It is also a notable advantage of the invention that it enables arc-welded junctions to be made between wires of different diameter. Thus, for example, a 0.1 mm. wire can readily be joined to a 1.0 mm. wire.

I claim:

1. A welding assemblage for arc-welding a junction of two wirelike elements comprising an insulating casing having formed therein a welding cavity, means for introducing an inert gas into the cavity, an electrode holder adapted to hold an electrode so that its tip projects into the cavity and a junction gripping unit of substantial heat capacity adapted to grip a junction to be welded so that the junction projects into the cavity, said unit comprising a fixed member and a rotatable member having an eccentric surface, said surface and member defining between them an aperture designed to receive said junction, rotation of said rotatable member resulting in variation in the size of said aperture, and means for supplying welding voltage to said holder and one of said members.

2. An assemblage according to claim 1, wherein said rotatable member consists of a rod which is journaled in said casing so as to be turnable about its longitudinal axis, said rod having formed on its periphery a groove of steadily increasing depth, said groove forming together with said fixed member, said aperture.

3. An assemblage according to claim 2, wherein said rod is of cylindrical shape and said groove is of a depth which increases from zero at one peripheral position to a maximum at a diametrically opposite peripheral position.